United States Patent [19]

von Voithenberg et al.

[11] Patent Number: 4,618,643

[45] Date of Patent: Oct. 21, 1986

[54] GLUE STICK ADHESIVES

[75] Inventors: Hubertus von Voithenberg; Gotz Hillert, both of Bad Homburg, Fed. Rep. of Germany

[73] Assignee: USM Corporation, Farmington, Conn.

[21] Appl. No.: 585,520

[22] Filed: Mar. 2, 1984

[30] Foreign Application Priority Data

Mar. 2, 1983 [GB] United Kingdom ............... 8305733

[51] Int. Cl.$^4$ ................... C08L 67/02; C08L 67/04; C08G 63/08; C08G 63/18
[52] U.S. Cl. .................................. 524/430; 524/605; 525/411; 525/444; 528/302
[58] Field of Search .............. 528/305, 302; 525/411, 525/444; 524/310, 605, 430

[56] References Cited

U.S. PATENT DOCUMENTS

| | | | |
|---|---|---|---|
| 3,169,945 | 2/1965 | Hostettler | 524/310 |
| 3,421,974 | 1/1969 | Wiener | 528/305 |
| 3,502,623 | 3/1970 | Hurworth | 528/305 |
| 3,669,921 | 6/1972 | Droke | 524/605 |
| 3,915,346 | 10/1975 | Allsop | 222/146 HE |
| 3,926,920 | 12/1975 | Georgoudis | 528/305 |
| 3,975,323 | 8/1976 | Georgoudis | 525/411 |
| 4,031,165 | 6/1977 | Saiki | 525/444 |
| 4,048,128 | 9/1977 | Eastman | 524/605 |
| 4,130,603 | 12/1978 | Tanaka | 525/408 |
| 4,436,896 | 3/1984 | Okamoto | 528/305 |
| 4,447,573 | 5/1984 | Holbeck | 524/605 |

FOREIGN PATENT DOCUMENTS

| | | |
|---|---|---|
| 998654 | 7/1965 | United Kingdom . |
| 1075183 | 7/1967 | United Kingdom . |
| 1402648 | 8/1975 | United Kingdom . |
| 1515727 | 6/1978 | United Kingdom . |

Primary Examiner—John C. Bleutge
Assistant Examiner—Patricia A. Short
Attorney, Agent, or Firm—Thomas S. Szatkowski

[57] ABSTRACT

Glue sticks for use in a hand held glue gun comprise thermoplastic copolyester corresponding to a product of an acid component comprising in selected proportions terephthalic acid, isophthalic acid and aliphatic dicarboxylic acid, an hydroxyl component comprising one or more aliphatic diols of which not less than 90 moles % is 1.4 butane diol, and a polymeric plasticizer component. The glue stick has a melting point of 90° to 120° C. and a reduced viscosity of 0.5 to 0.7. Preferred glue sticks have a melting point of about 110° C., a reduced viscosity of 0.6 to 0.65 and comprise a copolyester from an acid component comprising 45 to 48 moles % terephthalic acid, 38 to 45 moles % isophthalic acid and 10 to 15 moles % azelaic acid, an hydroxyl component comprising 1.4 butane diol and 1.6 hexane diol in a molar ratio of 90 to 95:5 to 10, and a polymeric plasticizer component comprising a polycaprolactone or selected hydroxy polyester to an extent of 3 to 4% by weight of the copolyester. The glue sticks can be used as general purpose adhesives and have useful open times.

10 Claims, No Drawings

GLUE STICK ADHESIVES

BACKGROUND OF THE INVENTION

1. The Field of the Invention:

The present invention is concerned with a hot melt adhesive composition in the form of a stick which may be melted and dispensed from a hot melt glue gun.

2. Description of the Prior Art:

Hot melt glue guns are becoming increasingly popular in various trades and with "Do-It-Yourself" enthusiasts. Examples of glue guns adapted to be held in the hand of an operator and used to dispense hot melt adhesives are shown in UK Patent Specification No. 1402648, and UK Registered Design Application No. 1009681.

In general, it is well known to provide glue guns adapted to be held in the hand of an operator with a melt chamber in which an end portion of a stick is received and melted by heat supplied to the melt chamber. Progressive melting of the glue stick may be achieved by pressing the glue stick into the melt chamber by means of the operator's thumb or a mechanical feed mechanism. Melted adhesive is dispensed from a nozzle of the gun as the stick is fed into the melt chamber and melted therein.

It is one practice to arrange that the melt chamber of such a gun is heated to such an extent that the melt chamber has a temperature in the region of 200° C. during normal operation, although it is known that the temperature of the melt chamber often varies between about 185° C. and 215° C., depending on the rate of dispensing adhesive. It is a practice to employ for the material of glue sticks, compositions based on ethylene vinyl acetate copolymer, having a softening range of about 70° C. to 80° C. and a viscosity at 200° C. of about 5,000 to 15,000 mpas.

Whilst adhesive compositions heretofor proposed for use with glue guns as above referred to are generally satisfactory in many respects, we have observed that the bond strengths achieved on substrates formed from certain materials are undesirably low for structural purposes (for example bonds to plasticised pvc, certain metals and wood) or demonstrate an undesirably low heat resistance of the bond for certain uses, or the adhesives demonstrate an undesirably low thermal resistance when molten. Known compositions also suffer from the disadvantage that the time available to the operator in which he may form a satisfactory bond before the adhesive composition has become too viscous or too hard to manipulate satisfactorily is inadequate under some circumstances, especially for the unskilled user.

It is one of the various objects of the present invention to provide an improved hot melt adhesive glue stick.

BRIEF SUMMARY OF THE INVENTION

We have now found that highly desirable properties may be achieved with a hot melt adhesive glue stick of appropriate cylindrical shape comprising a copolyester formed from certain specific reactants and having certain viscosity and melting point characteristics.

The present invention provides a hot melt glue stick suitable for use in conjunction with a device for melting and dispensing a glue stick, the glue stick comprising thermoplastic copolyester material corresponding to a condensation product of (a) an acid component consisting essentially of
 44 to 53 moles % of terephthalic acid,
 33 to 48 moles % of isophthalic acid, and
 0 to 20 moles % of aliphatic dicarboxylic acids having 4 to 12 carbon atoms in its molecular chain,
and
(b) a hydroxyl component comprising one or more aliphatic diols of which not less than 90 moles % of the aliphatic diols is 1.4 butane diol, and
(c) a polymeric hydroxyl bearing plasticiser component present to an extent of about 1 to about 10 wt % of the components (a) and (b) provided that when the hydroxyl component (b) consists solely of 1.4 butane diol, the polymeric plasticiser is present to an extent of not less than 3% by weight of the components (a) and (b).

The glue stick has a melting point (DSC) in the range 90° to 120° C., and a reduced viscosity (measured in a mixture of phenol and tetrachlorethane in a ratio by weight of 60 to 40 using 0.4 g copolyester per 100 ml mixture) of 0.5 to 0.7.

DESCRIPTION OF PREFERRED EMBODIMENTS

In a glue stick according to the invention the ingredients are selected to provide melting point and viscosity characteristics commensurate with convenient melting and application of the composition using a hot melt glue gun as aforesaid and to provide adhesive properties suitable for various applications. The glue stick has a melting point which is sufficiently high for adequate control of melting of the stick in the glue gun, for a desirable span between softening point and application temperature to provide suitable wetting of substrates to be bonded when the melted glue is applied, for desirable heat resistance in the ultimate adhesive bond. The glue stick also has viscosity and rheology characteristics when melted in a glue gun such that the glue can be extruded readily when required and yet does not drool in significant quantities from the gun during periods when extrusion of glue is not required.

The type and concentration of the dicarboxylic acids affects the physical properties, for example melting range, glass transition temperature, degree of crystallinity and speed of crystallisation which are important to serviceability of bonds formed. For good heat resistance of bonds under load, the melting point of the glue stick is desirably at least 100° C. Polyesters with a melting point of more than 120° C. are difficult to handle properly in a glue gun, because the capacity of the heating cartridge normally used in such guns is too small for adequate melting rates. Moreover, the difference between melting point and application temperature affects wetting ability of the melted glue as well as the open time of the glue. We have observed that the difference between melting range and application temperature should be at least 70° C. Otherwise, the tensile shear strength of bonds formed is likely to be undesirably low. Accordingly, the ingredients of the copolyester are chosen so that the glue stick has a melting point (DSC) of 90° C. to 120° C., preferably about 105° C. to 110° C. By the expression melting point DSC where used herein is meant the endotherm peak observed in a differential scanning calorimetry determination.

We believe that some degree of crystallinity is desirable in adhesive bonds under many circumstances as it contributes to strength and heat resistance of certain bonds. Amorphous polyesters exhibit a smaller value of heat of fusion and exhibit high output from a glue gun, but such polyesters remain tacky and soft when solidified and are not readily handled in a glue gun, nor do they provide bonds of improved strength on various materials. Increased degrees of crystallinity of the glue stick limit the output of melted adhesive from glue guns provided with the usual small capacity heating cartridge. We believe the rate at which crystallization occurs is important in relation to speed of set up of the bond, and in relation to open time of the glue. There is thus a balance to be achieved between degree of crystallisation and rate of crystallisation in order to achieve a desirable blend of properties. Butane diol terephthalate polyesters are known as adhesives, but are rather crystalline and have high melting points. To reduce the degree of crystallinity and the rate of crystallisation of the glue stick the regularity along the polymer chain of the polyester is interrupted by virtue of different acid and diol residues in the chain. Presence of isophthalic acid residues and aliphatic acid residues in the terephthalate copolyester molecules is believed to interfere with orientation of the molecules, and leads to less crystalline materials of lower melting point. A blend of melting point, melt output, setting time, bond strength, heat resistance and other properties required of material for use in manufacture of glue sticks has been observed in saturated linear copolyesters formed from 44 to 53 moles % terephthalic acid, 33 to 48 moles % isophthalic acid and up to 20 moles % aliphatic dicarboxylic acid having 4 to 12 carbon atoms in its molecular chain. Suitable aliphatic acids include adipic, azeliac and sebacic acids and mixtures thereof. Outside these ranges, larger amounts of terephthalic acid lead to higher melting points and greater crystallinity, whereas larger amounts of isophthalic or aliphatic acids lead to decreased melting point, decreased crystallinity and decreased heat resistance. Also, increased amounts of the aliphatic dicarboxylic acid lead to polyesters of lower viscosity and increased flexibility and consequently a more rubbery glue stick, and more flexible bonds. When polycaprolactone diol is included as polymeric plasticiser component in preparation of the copolyester, it is possible to use somewhat lower quantities of the aliphatic acid and it may even be possible to omit it entirely. However, we prefer to use 10 to 20 moles % of an aliphatic acid as aforesaid. We prefer to use 45 to 48, moles %, more preferably about 46 moles % terephthalic acid, 38 to 45 moles and more preferably about 41 moles % isophthalic acid and 10 to 15, moles %, more preferably about 13 moles % azeliac acid to provide the acid components.

The hydroxyl component used in forming the copolyester comprises one or more aliphatic diols of which not less than 90 moles % of the aliphatic diols is 1.4 butane diol. The diol mixture is chosen in conjunction with the acids in such a way as to provide the copolyester with required properties as aforesaid, including melting point, crystallinity properties and also softness, flexibility and handling characteristics. Additional aliphatic (or cycloaliphatic) diol is preferably employed in the hydroxyl component, for example 1.6 hexane diol, 1,2 propane diol, neopentyl glycol, ethylene glycol, or 1.4-bis(dimethylol)-cyclohexane. We prefer to use blends of 1.4 butane diol and 1.6 hexane diol in the ratio 90 to 95 moles % 1.4 butane diol to 1.4 butane diol to 5 to 10 moles % 1.6 hexane diol. When the amount of hexane diol is increased, the polyester becomes less crystalline, softer and more flexible. Whilst some softness and flexibility are preferred in order to give the glue stick a suitable feel during manipulation of the glue stick for example in a "thumb gun," excessive softness and flexibility is undesirable as this may cause problems when triggering or pushing such a glue stick in a glue gun. We prefer to use a blend of 1.4, butane diol and 1.6 hexane diol in a molar ratio of about 95:5.

The polymeric hydroxyl bearing diol plasticiser component is included in a glue stick according to the invention, in order to achieve desirable low melt viscosity and wetting characteristics. This plasticiser component performs in the copolyester as a so called internal plasticiser. We prefer to use a plasticiser component which does not adversely influence the colour or thermal stability of the glue stick.

We prefer to use as polymeric plasticiser component a long chain polyfunctional polyol, for example a polycaprolactone diol or a hydroxy polyester to an extent of from about 1 to about 10%, more preferably 1 to 8% by weight of the polyester. We prefer to use a plasticiser which also contributes to handling properties of the glue stick, for example a measure of slipperiness of the glue stick is desirable when using the glue stick in a glue gun. We prefer to use a polycaprolactone diol of molecular weight from about 500 to about 5000 or a hydroxy polyester. Preferred polyester plasticisers are liquid (at room temperature) materials having molecular weights of the order of about 5000. One preferred polyester plasticiser is available under the trade name Paraplex 41, which is understood to be based on one or more aliphatic dibasic acids for example azelaic, adipic or sebacic acid and one or more diols some or all of which diols is or are different from those of copolyesters as discussed herein, and to have some hydroxyl groups available for reaction with carboxylic acid. We prefer to use Paraplex 41 having a hydroxyl value in the range 100 to 500 mval/Kg to provide about 3 to 4% of this plasticiser by weight of the copolyester ingredients, and to add this material to the copolyester forming ingredients at the end of the polyester forming reaction.

In glue sticks according to the invention, the molecular weight of the polyester is such that the glue stick has a reduced viscosity (measured in a mixture of phenol and tetrachlorethane in a ratio by weight of 60 to 40 using 0.4 g of polyester per 100 ml mixture) from about 0.7 to 0.5, and is preferably from about 0.6 to about 0.65. Output of the melted glue stick from a glue gun as aforesaid may be too small at a reduced viscosity of greater than 0.7, and drooling from the nozzle may occur at a reduced viscosity below 0.5. These reduced viscosity values are commensurate with a melt viscosity at 200° C. in the range of about 18,000 to about 28,000 MPas.

The copolyesters may be made in any convenient way, for example one may use an esterification method using the acids themselves, or one may use a transesterification method in which the lower alkyl esters of the aromatic acids e.g. dimethyl terephthalate are used.

In order to minimise thermal degradation and hydrolytic reactions of polyesters catalysed by carboxylic acids during production, or use of the glue stick in a glue gun, we prefer to ensure that the acid number of the copolyester is kept as low as possible, for example less than 3 mg KOH/g polyester. In addition we prefer to employ an antioxidant, for example an ester of phosphoric acid in order to enhance stability at temperatures up to 240° C.

Glue sticks according to the invention may also include other additives if required for example colourants i.e. dyes or pigments, waxes, but this is not preferred. Minor quantities of fillers may be included to serve as nucleating promotor and are desirable in those cases where a more rapid build up of crystallinity is desired. For this purpose we prefer to employ up to 1% by weight of the composition of an inert filler for example polyethylene or more preferably an inorganic material for example titanium oxide or calcium carbonate.

Glue sticks according to the invention may be made by any suitable method. For example one may cast the copolyester into a tubular mould, to provide cylindrical sticks of diameter commensurate with the entry port of a glue gun. The glue sticks may be aged in the mould overnight until they have developed at least some crystallinity, before using them.

We have found that a glue stick according to the present invention may be used in a glue gun with a melt chamber heated nominally to about 200° C. to form bonds of good strength on plasticised polyvinyl chloride, wood, glass and metals. Bond strength values of the order of 6 to 8 Newtons per square mm have been observed. We have also observed that such bonds when at 70° C. display a tensile strength of 0.7 to 0.9 Newtons per square mm. These values are in excess of those obtained with conventional adhesive composition glue sticks based on ethylene vinyl acetate copolymer. We have also observed that glue sticks according to the invention demonstrate surprisingly good stability when the melted composition is held in the gun without dispensing composition from the nozzle for a period of several minutes or more. Another significant property of glue sticks according to the invention resides in the ability of the glue to remain capable of being squeezed in formation of a bond for many seconds or even two minutes after application from a glue gun, thus enabling production of good bonds as long as two minutes after application of the glue from a glue gun. Thus the glue sticks have useful open times and can be used as general purpose adhesives.

In order that the invention may be more fully understood, there now follows a detailed description of eight example glue sticks provided by the invention and illustrative thereof, and of comparative example glue sticks. It is to be understood that these illustrative glue sticks have been selected for description merely to illustrate aspects of the invention by way of example.

The illustrative glue sticks and comparative examples 3, 4 and 5 comprise linear saturated copolyesters corresponding to the reaction products of acid diol and plasticiser components as shown in Table 1. The polycaprolactone used had a molecular weight of about 4000. The polyester plasticiser used was Paraplex 41, a liquid polyester based on one or more aliphatic dibasic acids having a hydroxyl value of 100 to 500 mval/Kg, soluble in ketones, aromatic hydrocarbons and chlorinated hydrocarbons having a colour rating (APHA) of 100 (50% solids) a specific gravity (25° C./15° C.) of 1.13, a viscosity (Poises 25° C.) of about 1100 and a freezing point ° F. of about −12 (about −24.5° C.).

The melting point of the copolyesters was measured by DSC method.

The reduced viscosity was measured at 21±2° C. using 0.4 g copolyester per 100 ml of a mixture of 60 parts by weight phenol and 40 parts by weight tetrachlorethane.

Each copolyester was formed into a glue stick by casting the melted copolyester into a tubular mould of 11.5 mm diameter. The glue sticks were aged in their moulds overnight, and then extracted from the moulds.

Various properties of the glue sticks were examined, using a trigger operated glue gun having a melt chamber as described in U.K. Patent Specification No. 1562926 (a Bostik Model 295) and equipped with an electrical resistance heater and an adjustable thermostat. The device had a conventional silicone rubber inlet tube secured to the melt chamber through which the glue stick is guided to the melt chamber. Using this device with the thermostat set at 200° C., glue sticks were fed into the melt chamber with a constant force, and the amount of glue dispensed from the nozzle of the gun measured. Results are shown in Table 2 in g/min. With the melt chamber of the gun inclined at 45° C. to the vertical, nozzle downward and no force on the trigger, the amount of glue dripping from the nozzle was measured. Results are given in Table 2.

Sample bonds were made by applying melted glue stick to a block of sanded beechwood, and pressing a second sanded block of beechwood onto the melt within thirty seconds of application of the melt. After ageing for one day, tensile shear strength of the bonds was measured on an Instron Tester. Results are given in Table 3.

A comparison was made regarding ease of manipulation of the glue sticks in the gun, having regard to stiffness and softness, slipperiness and comfort in handling the stick in the gun. Results of this comparison are shown in Table 2, letter G indicating good manipulation characteristics, letter H indicating too hard, letter A indicating too tacky and soft, and letter S indicating too soft for satisfactory feeding.

From Tables 1 and 2 it will be appreciated that use of 1.4 butane diol as the sole hydroxy component of the copolyester and absence of polymeric plasticiser leads to hard glue sticks having comparatively low output coupled with low dripping and good bond strength on beechwood. Inclusion of polymeric plasticiser leads to an improvement in manipulation characteristics, lowering of viscosity and increase in output and dripping. Compare for example illustrative glue sticks 1, 4 and 5 with comparative example 3. Use of insufficient amounts of 1.4 butane diol lead to copolyesters which are too soft or have insufficient crystallinity for use as glue sticks. Compare for example comparative examples 2 and 3. Effects on for example viscosity and melting point can be seen from comparison of the properties of the illustrative glue sticks.

We believe that glue sticks having most suitable properties for gluing a variety of substrates demonstrate not only good manipulative characteristics when used in a glue gun but also an output rate of not less than about 18 g/min, a maximum dripping value of 2.5, more preferably 2 and a bond strength on beechwood greater than 4.0 N/mm$^2$ more preferably greater than 5 N/mm$^2$. In this respect, it is noted that illustrative glue sticks 6 and 7 demonstrate a good blend of properties. As can be seen from Table 1 these glue sticks employ the preferred type and amounts of acid component and hydroxyl component, and preferred polymeric plasticiser components.

The open time of the illustrative glue sticks was examined. It was noted that each of the illustrative glue sticks could be used to form a strong adhesive bond even when pressing together of the substrates occurs some time after application of the melted glue stick. Using comparative example 2 (a commercially available glue stick based on ethylene vinyl acetate copolymer) beads of melted glue of about 0.3 c.c. i.e. several beads of diameter approximately by 2 mm were formed on beechwood blocks. It was found that bonds of about 2.3 N/mm² could be formed thirty seconds after application and the bead could be compressed by hand pressure to give a bond line about 0.2 mm thick. Bonds formed sixty seconds after application of the melt showed shear results of about 1.5 N/mm² and the bead was compressed by hand pressure to about 0.4 mm. Bonds formed ninety, one hundred and twenty, and one hundred and eighty seconds after application of the melt showed shear results of about 1.25, 1 and 0.65 N/mm² respectively and the beads could be compressed by hand pressure to 0.65, 0.87 and 5 mm respectively. In contrast, using illustrative glue stick 6, bond strengths of 5.1, 4.7, 4.2, 3.9 and 3.5 N/mm² were obtained (using similar test conditions) thirty, sixty, ninety, one hundred and twenty, and one hundred and eighty seconds respectively after laying down a melted bead of about 0.3 c.c. i.e. several beads of diameter approximately 2 mm diameter. Also, the beads could be compressed by hand pressure to a thickness of 0.27, 0.34, 0.45, 0.6 and 5 mm after thirty, sixty, ninety, one hundred and twenty and one hundred and eighty seconds respectively. This feature of the illustrative glue sticks allows more time in which to adjust the bond and still achieve a good bond strength.

In order to demonstrate advantages of using a nucleating agent, an illustrative glue stick 6A was made using the formulation of illustrative glue stick 6 and incorporating about 0.5% by weight titanium dioxide uniformly dispersed through the formulation. It was found that especially the initial bond strength directly after application was increased due to a nucleating effect of the titanium dioxide. For example with illustrative glue stick 6, the initial strength (i.e. strength 10 minutes to 1 hour after bonding) of bonds formed between beechwood blocks within 30 seconds of application of the melt was found to be about 0.5 N/mm². Values of about 3 N/mm² were observed using illustrative glue stick 6A under similar application and test conditions. Bond strength of the samples made using illustrative glue stick 6 was the same as that of the sample using illustrative glue stick 6A (about 5.6 N/mm²) 24 hours after forming the bonds.

In order to demonstrate various other properties, illustrative glue stick 6 was used to prepare sample bonds to various substrates. These sample bonds were compared with sample bonds made using comparative examples 1 and 2 (commercially available glue sticks based on ethylene vinyl acetate copolymer). Results of these and other tests are shown in Table 3.

Tensile-shear strength at 23° C. was measured after ageing the bonds for one day at room temperature. Tensile shear strength at different temperatures was measured at 23° C. immediately after ageing the bonds for one day at the appropriate temperature. Heat resistance under load was measured using a dead load test using a 1 Kg weight.

The results show the good adhesion of the illustrative glue sticks to a variety of commonly used materials at room temperature and higher temperatures, good heat resistance of the bond, and improved characteristics in the heated glue gun.

TABLE 1

|  | Illustrative Glue Sticks |  |  |  |  |  |  |  | Comparative Examples |  |  |
|---|---|---|---|---|---|---|---|---|---|---|---|
| Acid Component (Mol %) | 1 | 2 | 3 | 4 | 5 | 6 | 7 | 8 | 3 | 4 | 5 |
| Terephthalic acid | 52.8 | 51 | 49 | 46 | 46 | 46 | 46 | 46 | 46 | 46 | 46 |
| Isophthalic acid | 47.2 | 36 | 38 | 41 | 41 | 41 | 41 | 41 | 41 | 41 | 41 |
| Azelaic acid | — | 13 | 13 | 13 | — | 13 | 13 | 13 | 13 | 13 | — |
| Adipic acid | — | — | — | — | 13 | — | — | — | — | — | 13 |
| Hydroxyl Component (Mol %) | | | | | | | | | | | |
| 1.4 Butane Diol | 100 | 95 | 90 | 100 | 100 | 95 | 95 | 91 | 100 | 70 | 80 |
| 1.6 Hexane Diol | — | 5 | 10 | — | — | 5 | 5 | 5 | — | 30 | 20 |
| 1.4 bis Dimethylol cyclo hexane | — | — | — | — | — | — | — | 4 | — | — | — |
| Plasticiser component (wt % of acid and hydroxyl component) | | | | | | | | | | | |
| Polycaprolactone | 8.6 | — | — | — | — | — | 3.5 | — | — | — | — |
| Polyester type plasticiser | — | 3.5 | 3.5 | 7.0 | 3.5 | 3.5 | — | 3.5 | — | 3.5 | 3.5 |
| Melting Point DSC° C. | 112 | 115 | 102 | 105 | 108 | 109 | 109 | 102 | 110 | — | .98 |
| Reduced viscosity | 0.60 | 0.64 | 0.65 | 0.65 | 0.55 | 0.61 | 0.64 | 0.59 | 0.7 | 0.83 | 0.62 |

TABLE 2

|  | Comparative Examples |  |  |  |  | Illustrative Glue Sticks |  |  |  |  |  |  |  |
|---|---|---|---|---|---|---|---|---|---|---|---|---|---|
|  | 1 | 2 | 3 | 4 | 5 | 1 | 2 | 3 | 4 | 5 | 6 | 7 | 8 |
| Output - g/min | 10-25 |  | 15 | 15 | 21 | 19 | 19 | 19 | 20 | 20 | 22 | 22 | 23 |
| Dripping - g/15 min | 2-8 |  | 0.5 | 1.3 | 2.0 | 1 | 1.5 | 1.8 | 2.3 | 3.5 | 0.5 | 2.0 | 2.8 |
| Tensile Shear Strength on Beechwood - N/Mm² |  |  | 5.5 | 2.6 | 5.8 | ? | 5 | 5.1 | 5.0 | 6.0 | 5 | 6.3 | 4.3 |
| Ease of manipulation in a glue gun |  |  | H | A | S | G | G | G | G | G | G | G | G |

TABLE 3

|  | Illustrative Glue Stick | Comparative Examples |  |
|---|---|---|---|
|  | 16 | 1 | 2 |
| Softening Point |  | 70-80° C. | 70-80° C. |
| Melt viscosity at 200° C., | M20,000 | 12,000 | 6,000 |

TABLE 3-continued

| Shear rate 130s$^{-1}$ mpas Colour | White | White/amber | Transparent |
|---|---|---|---|
| Tensile shear strength (N/mm$^2$) (at 23° C.) on: | | | |
| Beechwood | 5.1 | 1.5 | 3.1 |
| PVC | 7.5 | 1.6 | 3.5 |
| Polycarbonate | 5.5 | 1.8 | 3.0 |
| Acrylonitrile-butadiene-styrene | 6.0 | 1.6 | 3.4 |
| Polymethyl methacrylate | 2.6 | 1.5 | 3.0 |
| Polyethylene | 0.7 | 1.0 | 1.5 |
| Glass | 5.8 | 1.5 | 2.1 |
| Steel, sandblasted* | 8.1 | 1.2 | 1.8 |
| Zinc-plated steel* | 6.0 | 1.3 | 2.0 |
| Aluminium* | 8.2 | 1.3 | 2.3 |
| Tensile shear strength at different temperatures on beechwood (N/mm$^2$) | | | |
| −10° C. | | 6.9 | 6.0 |
| +23° C. | | 5.1 | 3.0 |
| +35° C. | | 2.7 | 0.7–1.0 |
| +70° C. | | 0.7 | 0 |

| | Illustrative Glue Stick 6 | Comparative Examples 1 | 2 |
|---|---|---|---|
| Heat resistance under load: | at 100° C. stable for 30 mins | at 55° C. bonds fail within 10 mins | |
| Tensile strength on concrete (N/mm$^2$) | 1.7 substrate failure | 1.7 substrate failure | |
| T-peel strength on steel, 30 mm wide (N) | 175 | 60 | |
| Impact strength (lb/m$^2$) | 83 | 30 | |
| Start to discharge a loaded gun | no problems | sometimes impossible when a transparent stick is handled in glue gun having teflon inlet tube | |
| Degradation of glue stick and odour at application temperature | weight loss 0.1% odourless | weight loss 0.5% odour | |
| Deterioration of the silicone inlet tube of the glue gun | no remarkable damage | deterioration may occur within a few weeks depending on the intensity of use. | |

*Substrates are pre-heated.

We claim:

1. A hot melt glue stick suitable for use in conjuction with a device for melting and dispensing a glue stick, the glue stick comprising thermoplastic copolyester material corresponding to a condensation product of:
(a) an acid component consisting essentially of
   44 to 53 moles % of terephthalic acid,
   33 to 48 moles % of isophthalic acid, and
   10 to 15 moles % of aliphatic dicarboxylic acid having 4 to 12 carbon atoms in its molecular chain and
(b) a hydroxyl component comprising one or more aliphatic diols of which not less than 90 moles % of the aliphatic diols is 1.4 butance diol, and
(c) a polymeric hydroxyl bearing diol polyester component present to an extent of about 1 to about 10 wt % of the components (a) and (b) provided that when the hydroxyl componet (b) consists solely of 1.4 butane diol, the polyester is present to an extent of not less than 3% weight of the components (a) and (b), the glue stick having a melting point (DSC) in the range 90 to 120° C., and a reduced viscosity (measured in a mixture of phenol and tetrachloroethane in a ratio by weight of 60 to 40 using 0.4 g copolyester per 100 ml mixture) of 0.5 to 0.7.

2. A glue stick of claim 1 where the acid component comprises 38 to 45 moles % of isophthalic acid.

3. A glue stick of claim 1 or claim 2 where the aliphatic dicarboxylic acid consists of azelaic acid.

4. A glue stick of claim 1 or claim 2 where the diol component comprises 5 to 10 moles % 1.6 hexane diol.

5. A glue stick of claim 1 or claim 2 where the polyester component comprises a polyester polyol having a hydroxyl value in the range 100 to 500 mval/Kg.

6. A glue stick of claim 1 or claim 2 where the copolyester has an acid value less than 3 mg KOH/g, a reduced viscosity from about 0.6 to 0.65 and a melting point (DSC) in the range of about 105° C. to about 110° C.

7. A glue stick of claim 1 or claim 2 comprising up to about 1 percent by weight of an inorganic oxide nucleating promotor.

8. A hot melt glue stick suitable for use in conjuction with a device for melting and dispensing a glue stick, the glue stick comprising thermoplastic copolyester material corresponding to a condensation product of an acid component comprising
about 46 moles % terephthalic acid,
about 41 moles % esophthalic acid, and
about 13 moles % aliphatic dicarboxylic acid having 4 to 12 carbon atoms in its molecular chain, and a hydroxyl component comprising 1.4 butane diol and a second aliphatic diol in a molar ratio of about 95:5, and a polymeric hydroxyl bearing diol polyester in an amount sufficient to provide about 3 to 4% by weight of the copolyester,
the glue stick having a melting point (DSC) in the range 105° to 110° and a reduced viscosity (measured in a mixture of phenol and tetrachloroethane in a ratio by weight of 60 to 40 using 0.4 gm copolyester per 100 ml mixture) of 0.6 to 0.65.

9. A glue stick of claim 8 comprising up to about 1% weight of an inorganic oxide nucleating promotor.

10. A glue stick of claim 8 where said hydroxyl bearing diol polyester is polycaprolactone.

* * * * *